United States Patent [19]

Credle, Jr. et al.

[11] Patent Number: 4,741,355

[45] Date of Patent: May 3, 1988

[54] LOW COST BEVERAGE DISPENSER VALVE ASSEMBLY

[75] Inventors: William S. Credle, Jr., Stone Mountain, Ga.; Alfred A. Schroeder, San Antonio, Tex.

[73] Assignee: The Coca-Cola Company, Atlanta, Ga.

[21] Appl. No.: 806,886

[22] Filed: Dec. 9, 1985

[51] Int. Cl.[4] ........................ F16K 11/14; F16K 31/56

[52] U.S. Cl. .................................... 137/269; 137/607; 222/129.1; 222/504; 222/505; 251/75

[58] Field of Search .................. 137/269, 607; 251/75; 222/129.1, 504, 505

[56] References Cited

U.S. PATENT DOCUMENTS

| | | | |
|---|---|---|---|
| 1,558,276 | 10/1925 | Peterson . | |
| 1,603,005 | 10/1926 | Flam . | |
| 2,276,433 | 3/1942 | Sturman | 277/20 |
| 2,469,189 | 5/1949 | Williams | 250/40 |
| 2,573,888 | 11/1951 | Benjamin et al. | 225/21 |
| 2,661,402 | 12/1953 | Balch | 200/18 |
| 2,678,064 | 5/1954 | Brown | 137/636 |
| 2,708,371 | 5/1955 | Pashby | 74/100 |
| 2,708,849 | 5/1955 | Steenbergh | 74/100 |
| 2,733,042 | 1/1956 | Culbertson | 251/75 |
| 2,743,738 | 5/1956 | Johnson | 137/625.4 |
| 2,822,891 | 2/1958 | Wallace | 188/152 |
| 2,855,958 | 10/1958 | Welty et al. | 137/637 |
| 2,875,977 | 3/1959 | Stone et al. | 251/331 |
| 2,879,801 | 3/1959 | Cornelius | 137/636.2 |
| 2,888,040 | 5/1959 | Terwilliger et al. | 137/635 |
| 2,921,605 | 1/1960 | Booth et al. | 137/636 |
| 2,980,140 | 4/1961 | McMillan | 137/637 |
| 3,048,195 | 8/1962 | Gottlieb | 137/637 |
| 3,088,490 | 5/1963 | Rockwood et al. | 137/637 |
| 3,167,090 | 1/1965 | Booth et al. | 137/604 |
| 3,199,738 | 8/1965 | Cary et al. | 222/129.2 |
| 3,277,921 | 11/1966 | Cornelius | 137/607 |
| 3,373,907 | 3/1968 | Batrow | 222/399 |
| 3,448,769 | 6/1969 | Cornelius | 137/607 |
| 3,455,332 | 7/1969 | Cornelius | 137/607 X |
| 3,503,541 | 3/1970 | Jacobs et al. | 222/129.1 |
| 3,653,548 | 4/1972 | Kotscha et al. | 222/129.1 |
| 3,655,097 | 4/1972 | Booth et al. | 222/129.4 |
| 3,667,724 | 6/1972 | Cornelius | 137/607 X |
| 3,902,636 | 9/1975 | Zilk | 137/607 X |
| 4,138,092 | 2/1979 | Apellaniz | 251/325 |
| 4,250,919 | 2/1981 | Booth et al. | 137/607 |
| 4,308,978 | 1/1982 | Bayly et al. | 222/449 |
| 4,549,675 | 10/1985 | Austin | 222/129.1 |
| 4,592,490 | 6/1986 | McMichael | 222/129.1 |

*Primary Examiner*—Gerald A. Michalsky

[57] ABSTRACT

A valve sub-assembly that can be used with either a mechanical or an electrical valve actuator, and in either pressure or gravity operation. The valve sub-assembly has a pair of paddle valves with valve actuating arms that are simultaneously snap actuated by a yoke of either the mechanical or electrical valve actuator. In addition, a valve assembly with a mechanical valve actuator that includes a snap acting, over-center spring arrangement. Also, a method for converting a valve assembly between pressure and gravity operation, and mechanical or electrical operation.

32 Claims, 13 Drawing Sheets

LOW COST BEVERAGE DISPENSER VALVE ASSEMBLY

BACKGROUND OF THE INVENTION

1. Field of the Invention

This invention relates to beverage dispenser valve assemblies and more particularly to one that is low cost and is convertible between being mechanical or electrical.

2. Description of the Prior Art

Electrically operated valve assemblies are well known in this art, however, they are relatively expensive. Less expensive mechanically actuated valve assemblies are known, however, they are subject to teasing, that is, they may open slowly, they may open only part way, and/or the syrup valve and the carbonated water valve may open at different times. It is also known to modify an electrical valve assembly by arranging the cup lever arm to directly open the valves, however, such a mechanical valve assembly is very subject to teasing. Mechanical valve assemblies are also known that use over-center spring mechanisms to provide snap action movement of a valve, see U.S. Pat. No. 3,088,490.

It is an object of the present invention to provide a beverage dispenser valve assembly that is not subject to the disadvantages of the prior art valve assemblies.

It is another object of the present invention to provide a beverage dispenser valve assembly that is easily convertible back and forth between one or more of being mechanically or electrically operated, between being for use in either a gravity or a pressure dispenser, and between being able to dispense either a standard flow rate or a fast flow rate.

It is another object of this invention to provide a low cost, non-teasible, mechanical valve assembly.

It is a further object of this invention to provide a beverage dispenser valve sub-assembly that can be set up for use as either a mechanical or an electrical beverage dispenser valve assembly.

SUMMARY OF THE INVENTION

A beverage dispensing valve sub-assembly that can be set up to operate either mechanically or electrically, and the resultant complete beverage dispenser valve assembly. The valve sub-assembly includes a valve body having two liquid conduits there through with a control valve in each conduit, a vertical, rear mounting plate connected to the valve body and spaced apart from a major portion thereof to provide an opening to receive either an electrical or a mechanical valve actuator, a flow control in each conduit, a movable actuating lever arm connected to each control valve and extending outside of each conduit, means for supporting a cup lever arm, and means for removably supporting either an electrical or a mechanical valve actuator in said opening.

The mechanical version includes a cup lever arm that actuates a non-teasable, mechanical valve actuator having a yoke and an over-center spring mechanism connected between the cup lever arm and the valves for snap opening the valves. This mechanical valve actuator is similar to an electrical actuator in both action and sound.

The electrical version includes a cup lever arm that actuates an electrical switch to energize a single solenoid. The solenoid snap moves a yoke that simultaneously opens both valves.

The beverage dispenser valve assembly of the present invention is easily convertible back and forth between mechanical or electrical operation, gravity or pressure operation, and standard or fast-flow rate.

BRIEF DESCRIPTION OF THE DRAWINGS

The present invention will be more fully understood from the detailed description below when read in connection with the accompanying drawings wherein like reference numerals refer to like elements and wherein.

DETAILED DESCRIPTION OF THE PREFERRED EMBODIMENTS

Figure 1:
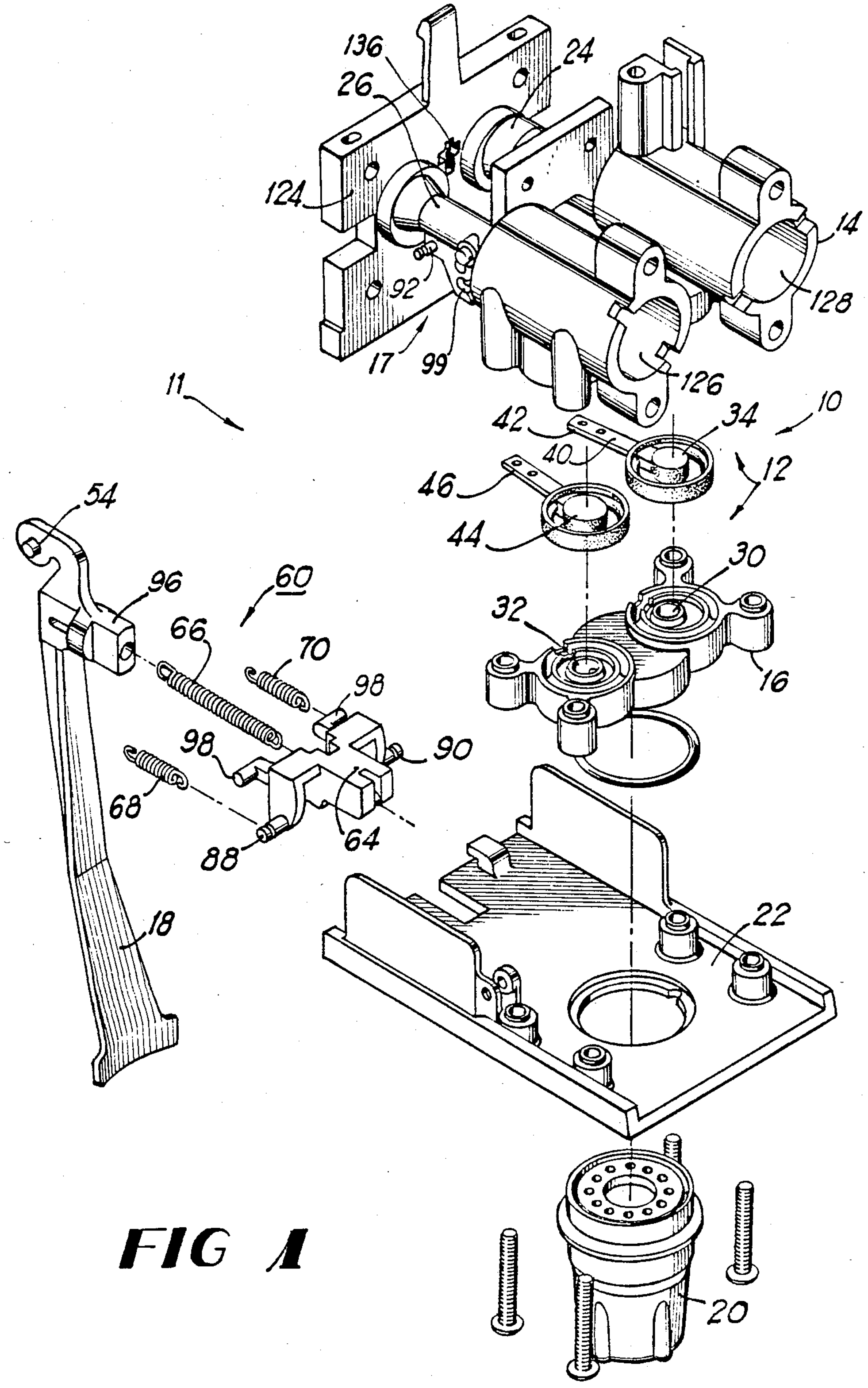
FIG. 1 is an exploded perspective view of the valve sub-assembly of the present invention set up for mechanical operation.

With reference now to the drawings, FIGS. 1–4 show the beverage dispenser valve sub-assembly 10 of the present invention set up for mechanical operation as a complete mechanical valve assembly 11, and FIGS. 5–9 show the sub-assembly 10 set up for electrical operation as a complete electrical valve assembly 101.

The valve sub-assembly 10 includes a valve body 12, including an upper valve body 14 and a lower valve body 16, a nozzle 20, a lower housing plate 22, a soda lever arm 160, and a vertical mounting plate 124 connected to the valve body 12 and spaced rearwardly from a major portion thereof to provide an opening 17 for receiving any one of a mechanical valve actuator 60 and its cup lever arm 18, or an electrical valve actuator 62 and its cup lever arm 100 (see FIGS. 5-9). Any one of a number of well-known nozzles 20 can be used.

The valve body 12 includes a syrup conduit 24 and a carbonated water conduit 26 therethrough. The syrup conduit extends from a syrup inlet port in the plate 124 through a aperture 30 in the lower valve body 16 to the nozzle 20. The carbonated water conduit 26 extends from a carbonated water inlet port in the plate 124 through a carbonated water aperture 32 in the lower valve body 16 to the nozzle 20. The nozzle 20 includes a mixing chamber or diffuser as is well-known in this art.

A syrup valve 34, preferably a paddle valve, is located in a syrup valve chamber 36 (see FIG. 3) and controls the on and off flow of syrup through the syrup conduit. The syrup valve 34 contacts a syrup valve seat 38 (see FIG. 3B) and includes an actuating lever arm 40 that extends outside of the syrup conduit and that includes a distal end 42.

A carbonated water valve 44, preferably a paddle valve, is located in a carbonated water chamber and controls the on and off flow of carbonated water through the conduit 26. The carbonated water valve 44 contacts a carbonated water valve seat and includes an actuating lever arm 46 that extends outside of the carbonated water conduit.

The soda lever arm 160 is pivoted about a pin 162 connected to the lower plate 22. When it is desired to dispense only soda water, the arm 160 is pushed back causing a finger 164 of the arm 160 to contact and actuate the lever arm 46 of the carbonated water valve 44.

The beverage dispenser valve sub-assembly 10 of the present invention can be set up for either electrical or mechanical operation by choosing either a mechanical valve actuator and corresponding cup lever arm or an electrical valve actuator with its corresponding cup lever arm. The particular valve actuator and its corresponding cup lever arm are easily removed from the beverage dispenser sub-assembly 10 and are easily replaced by the other valve actuator with its cup lever arm to convert the valve assembly back and forth between mechanical or electrical operation, as will be described in detail below. In both the mechanical and electrical versions, the cup lever arm force is light enough to not damage the cup, but strong enough to operate the valve assembly.

The mechanical valve actuator 60 will first be described with reference to FIGS. 1-4, and then the electrical valve actuator 62 will be described with reference to FIGS. 5-9.

Figure 3:
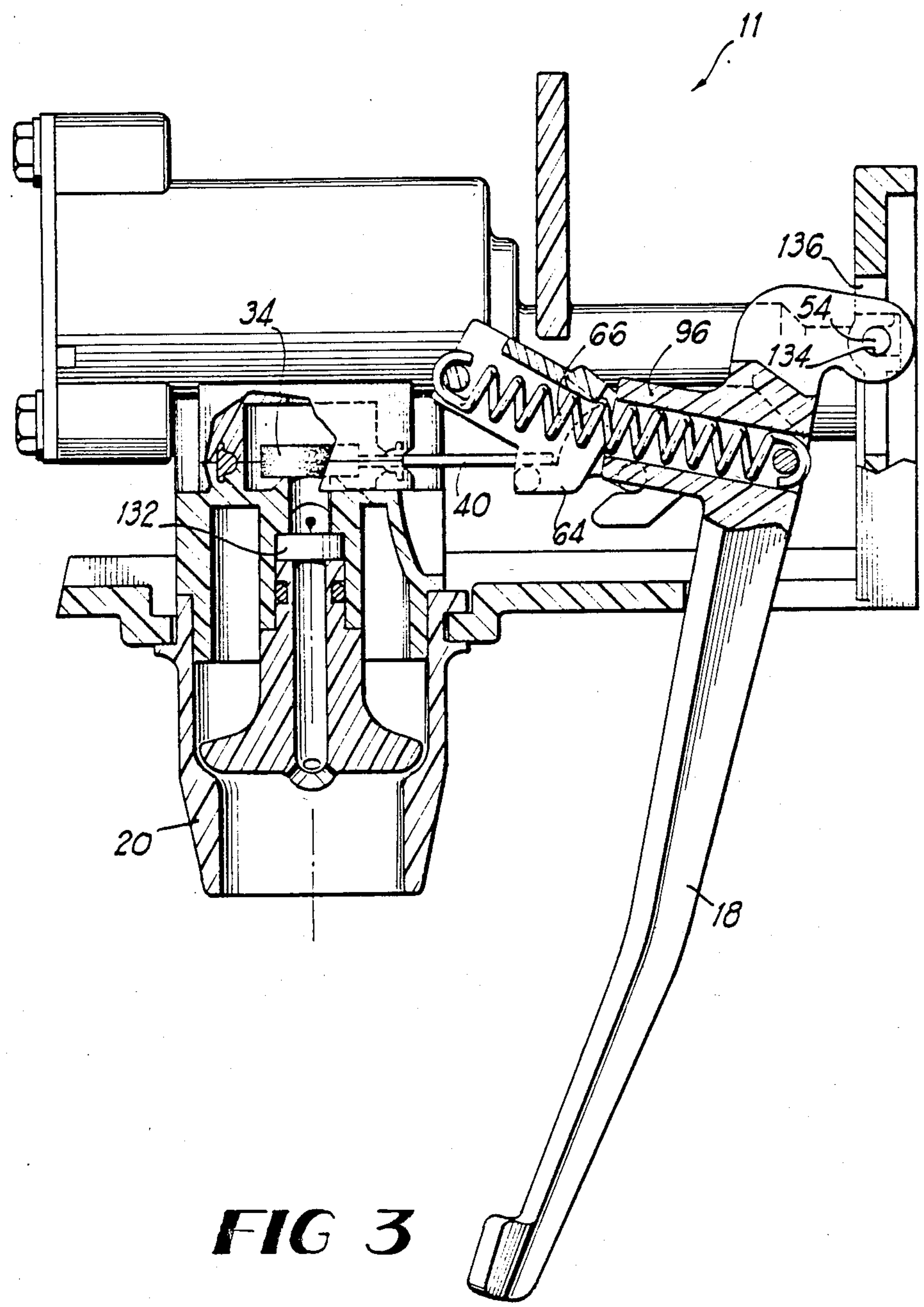
FIGS. 3, 3A and 3B are partly cross-sectional, partial side views of the mechanical valve actuator showing the progressive movement of the cup lever arm and corresponding movement of the mechanical valve actuator.
Figure 3B:
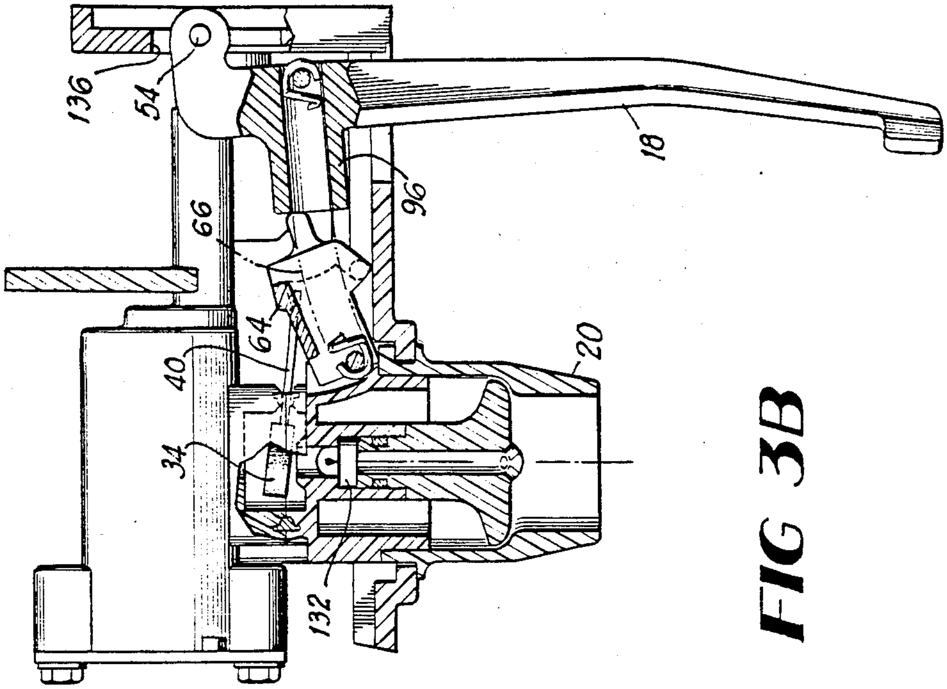

The cup lever arm 18 is mounted for movement about a pivot axis 54 and has a rest position (shown in FIG. 3) and an actuated position (shown in FIG. 3B). In the actuated position, a mechanical valve actuator 60 causes a beverage to be dispensed from the nozzle 20. The mechanical valve actuator 60 couples the movement of the cup lever arm 18 to the simultaneous opening of the syrup and carbonated water valves 34 and 44, respectively.

When the bottom end of the cup lever arm 18 is pushed back, by a hand-held cup (not shown), to receive a beverage to be dispensed from the nozzle 20, the mechanical valve actuator 60 causes the distal ends of the two paddle valve arms 40 and 46 to snap downwardly to quickly, fully and simultaneously open the paddle valves 34 and 44. Carbonated water and syrup then flow through the apertures 30 and 32, respectively, to the nozzle 20 where they are mixed together and discharged into the cup.

Figure 2:
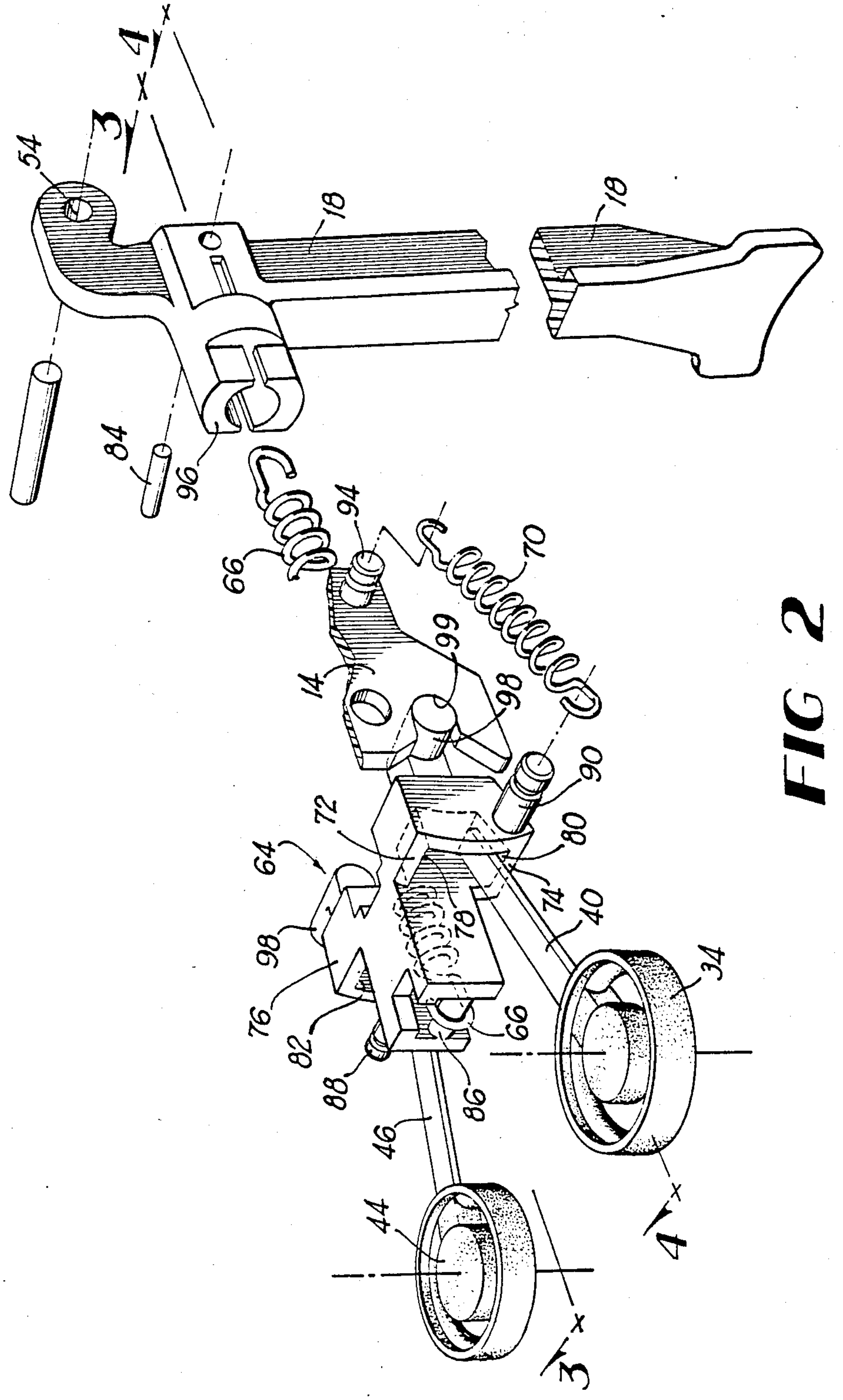
FIG. 2 is an enlarged, exploded, perspective view of the mechanical valve actuator.

The movement of the cup lever arm 18 causes the snap action of the paddle valves 34 and 44 by means of the non-teasable, over-center valve actuator 60. The valve actuator includes a yoke 64, a central coil spring 66 connected between the yoke 64 and the cup lever arm 18, and a pair of outboard coil springs 68 and 70 connected between the yoke and the upper body 14. The yoke 64 is shown in FIG. 2 and includes separate first and second contacting means for snap contacting the two valve lever arms. These contacting means include a pair of syrup valve arms 72 and 74 and a single carbonated water valve arm 76. Each of the arms 72 and 74 has a lever arm contacting surface 78 and 80, respectively, and the arm 76 has a lever arm contacting surface 82. These contacting surfaces snap contact the distal end of the respective valve lever arm causing the respective valve 34 or 44 to snap open or close. To allow carbonated water to be separately dispensed from the valve assembly, the yoke 64 is not provided with an arm and corresponding contacting surface to cause closing of the carbonated water valve. The pressure of the carbonated water on top of the carbonated water paddle valve 44 is sufficient to cause snap closing of the valve 44.

The coil extension spring 66 extends between a pin 84 on the cup lever arm 18 and a pin 86 on the yoke 64. This spring 66 pulls the cup lever arm 18 into its rest position (FIG. 3) and also keeps the yoke 64 in its upper or rest position (as shown in FIG. 3). The outboard springs 68 and 70 are connected at one end to pins 88 and 90, respectively, on the yoke 64 and at the other ends thereof to pins 92 and 94 on the upper valve body 14. The yoke 64 includes a pair of pivot pins 98 that are received in a pair of slots 99 in the upper valve body 14.

The cup lever arm 18 has a pin 54 at its upper end which fits in a groove 134 (see FIG. 3) in the rear mounting plate 124. The rear plate 124 has a cross shaped opening 136 to receive the upper end of the cup lever arm 18 and the pin 54, during assembly.

Figure 3A:
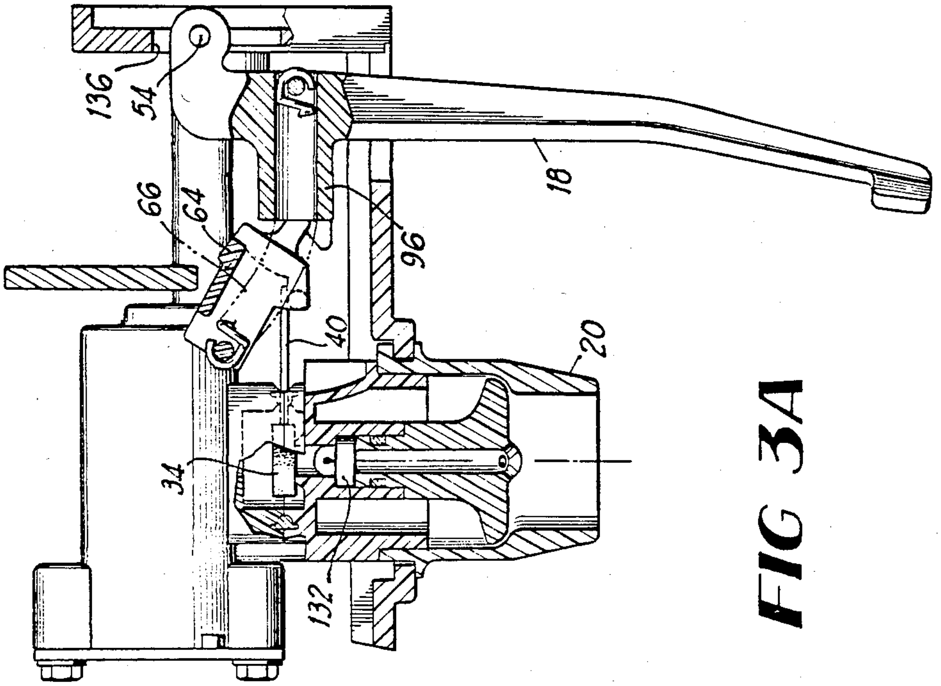
Figure 4:
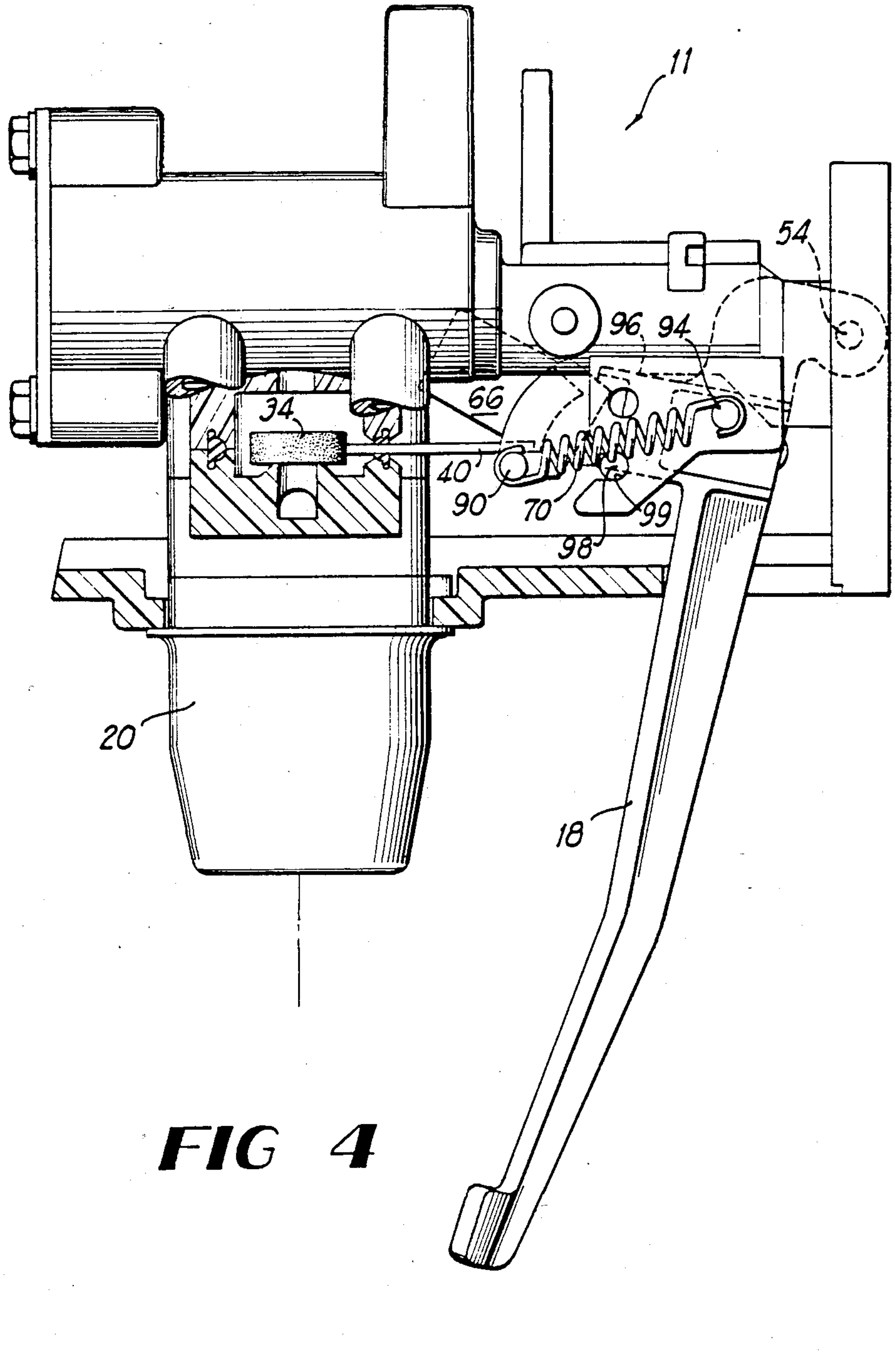
FIGS. 4, 4A and 4B correspond to FIGS. 3, 3A and 3B and are partly cross-sectional, partial side views of the mechanical valve actuator showing the progressive movement of the cup lever arm and the corresponding movement of another portion of the mechanical valve actuator.
Figure 4B:
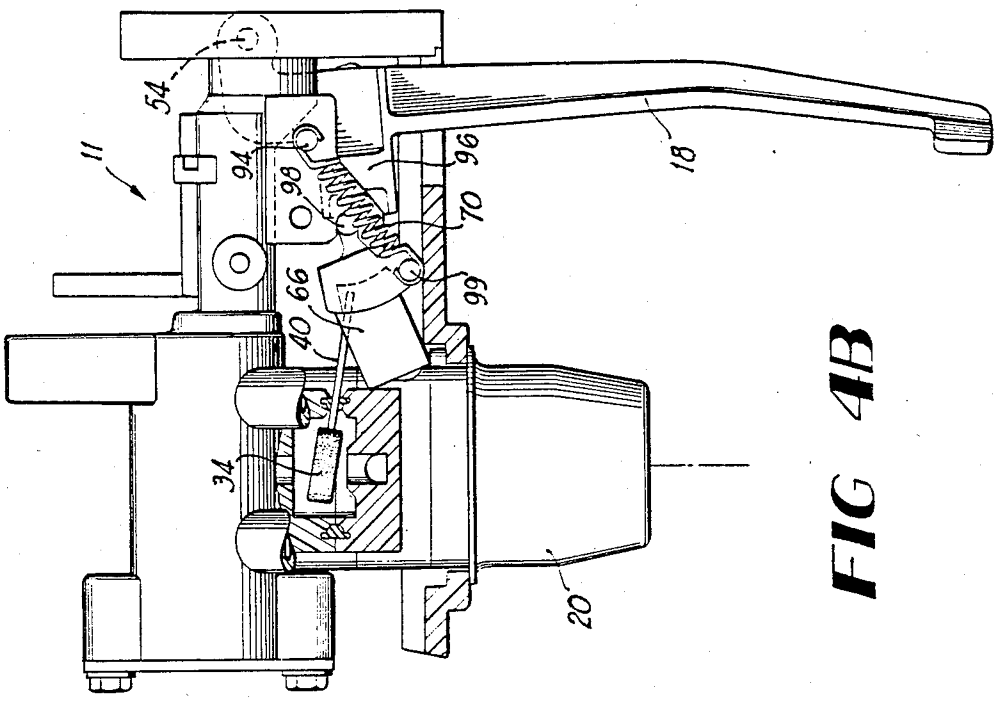

When the cup lever arm 18 is moved toward its actuated position, as shown progressively in FIGS. 3A and 3B, the springs 66, 68 and 70 move over-center and cause the yoke 64 to snap move downwardly (to its actuated position shown in FIG. 3B), snap moving the syrup and carbonated water valves 34 and 4 open (see FIGS. 3B and 4B). As shown in FIGS. 3, 3A and 3B, and in FIGS. 4, 4A and 4B, the progressive movement of the cup lever arm 18 causes the springs to all move more and more toward their over-center position until they finally do snap move to the actuated position shown in FIGS. 3B and 4B.

It is noted that the spring 66 is aided in moving over-center by virtue of the pin 84 on the cup lever arm 18 moving downwardly as the cup lever arm pivots backwardly. In addition, the top of a spring housing 96 of the cup lever arm 18 contacts the spring 66 about midway of its length as the lever arm 18 moves backwardly, causing the spring 66 to bend downwardly and eventually reach its over-center position. Without this bending feature, it would be necessary to use a separate return spring to return the cup lever arm 18 and the mechanical valve actuator 60 to their rest position, after the beverage has been disposed into the cup (not shown) and the cup has been withdrawn. However, this bending feature of the spring 66 causes the return of the cup lever arm 18 and the mechanical valve actuator 60 to their rest position solely by the force of the spring 66 itself.

Figure 4A:
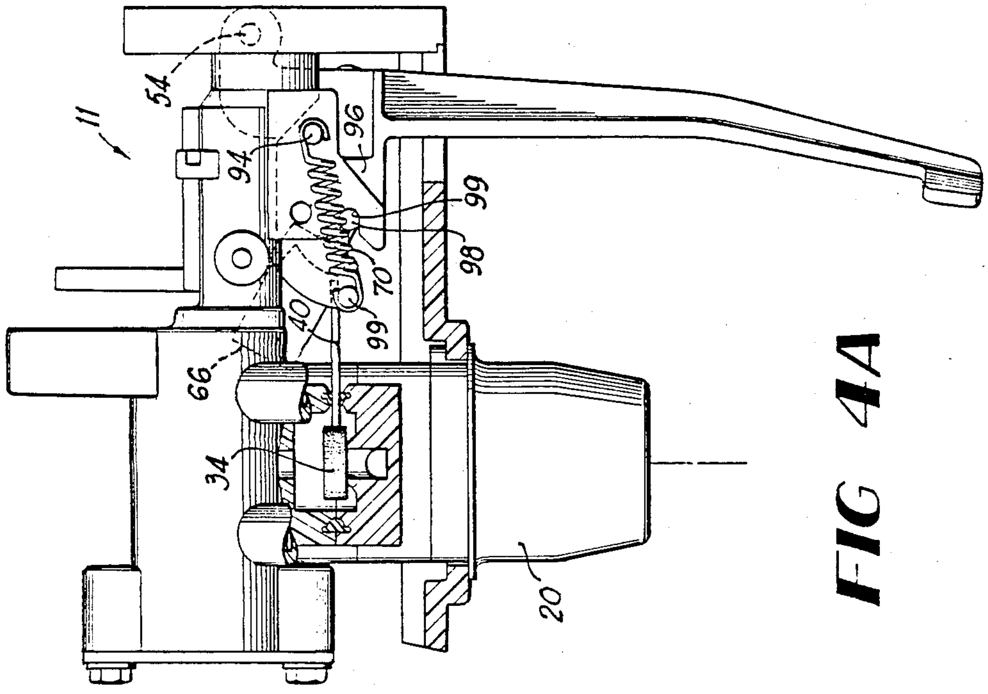

While the mechanical valve actuator 60 can operate with just the single center coil spring 66, it is preferred to also use the two outboard springs 68 and 70. The outboard spring 70 and the pins 90 and 94 to which it is connected are shown in FIGS. 4, 4A and 4B. A line connecting the pins 90 and 94 is located just above the yoke pivot pin 98 in the rest position (see FIG. 4) and just below the yoke pivot pin 98 in the actuated position (see FIG. 4B).

The purpose and function of these two outboard springs, compared to having only a single spring 66, is to reduce the force required to move the cup lever arm 18 while maintaining the force that snap moves the two paddle valves 34 and 44. It is not clear how this spring arrangement achieves this result, however, it does.

When the lever arm 18 is released, the spring 66 causes the arm 18 thus the yoke 64 and the valves 34 and 44 to return to their at-rest position. The force of the center spring 66 to return the mechanical valve actuator 60 to its at-rest position is greater than the force of the two outboard springs 68 and 70 tending the hold the mechanical valve actuator 60 in its actuated position. The central coil spring 66 also provides a major portion of the snap acting force during actuation of the valve actuator 60.

The electrical valve actuator 62 (see FIG. 5) will now be described with reference to FIGS. 5–9, which show the beverage dispenser valve sub-assembly 10 of the present invention set up for use as a complete electrical beverage dispenser valve assembly 101. The electrical valve actuator includes a cup lever arm 100 and its return spring 102, an electrical switch 104 with a push button 106, a yoke 108, and a single solenoid 110.

Figure 5:
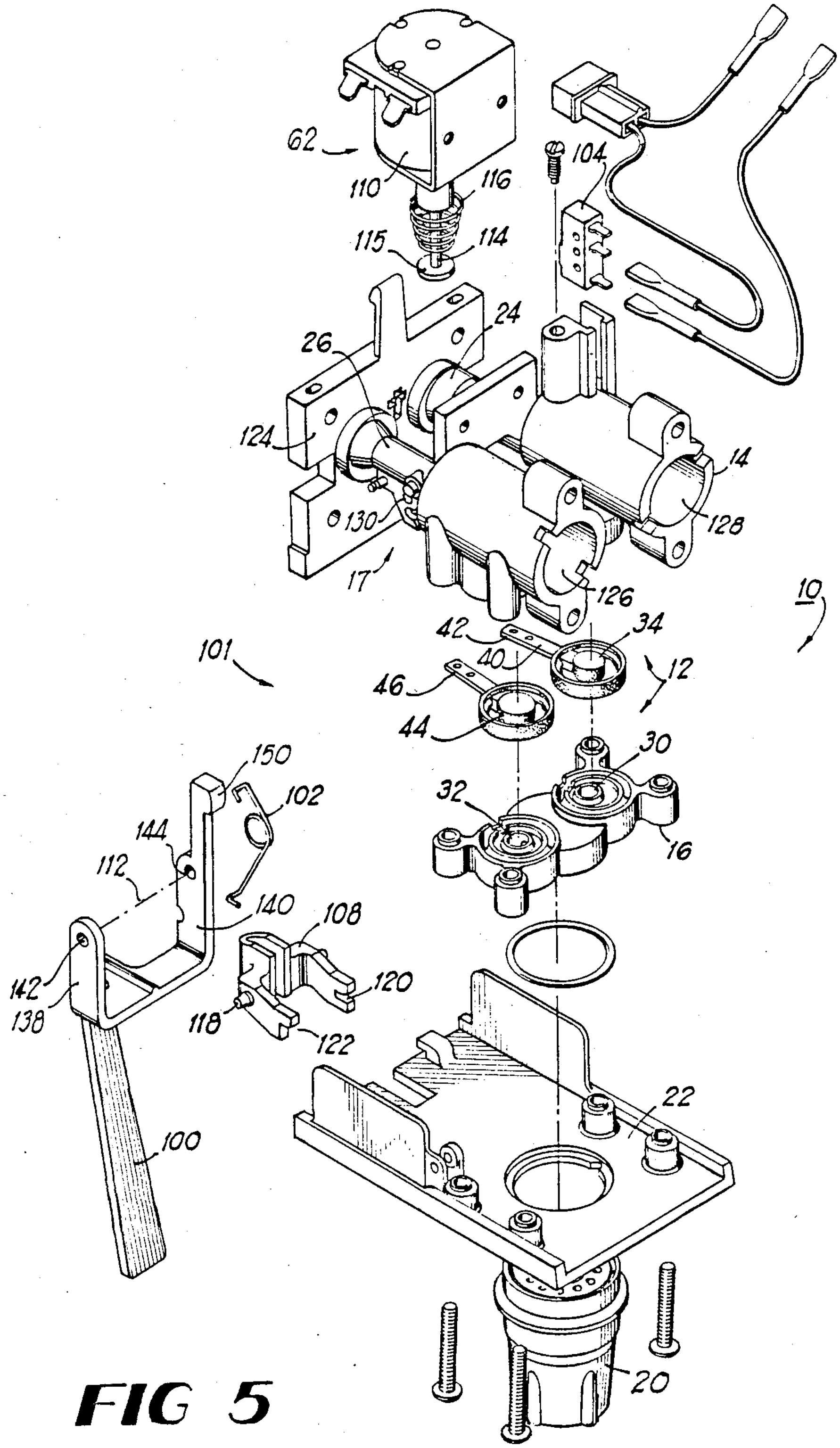
FIG. 5 is an exploded, perspective view of the valve sub-assembly of the present invention set up for electrical operation.
Figure 6:
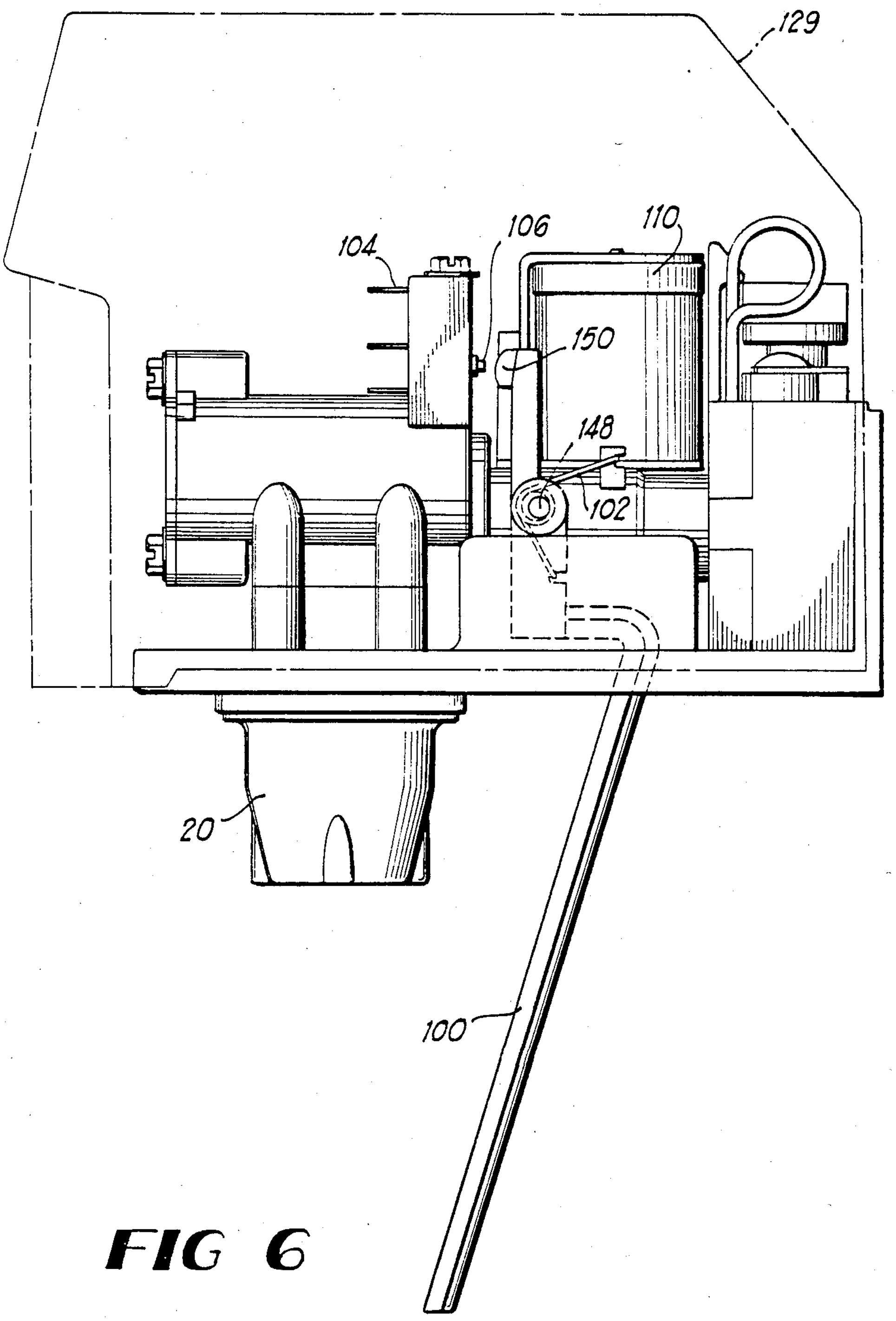
FIG. 6 is a side elevation view of the valve assembly of FIG. 5.
Figure 8:
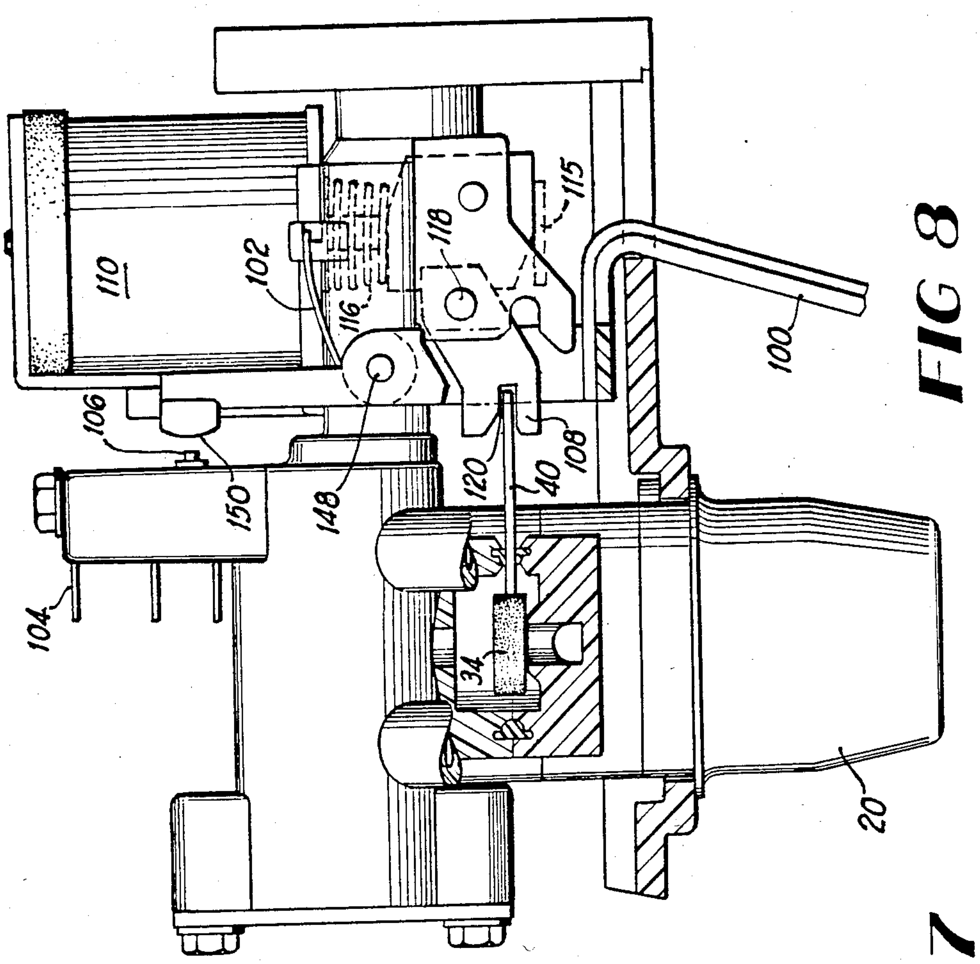
FIGS. 8 and 9 are partial, side views showing the rest position and the energized position, respectively, of the electrical valve actuator.
Figure 7:
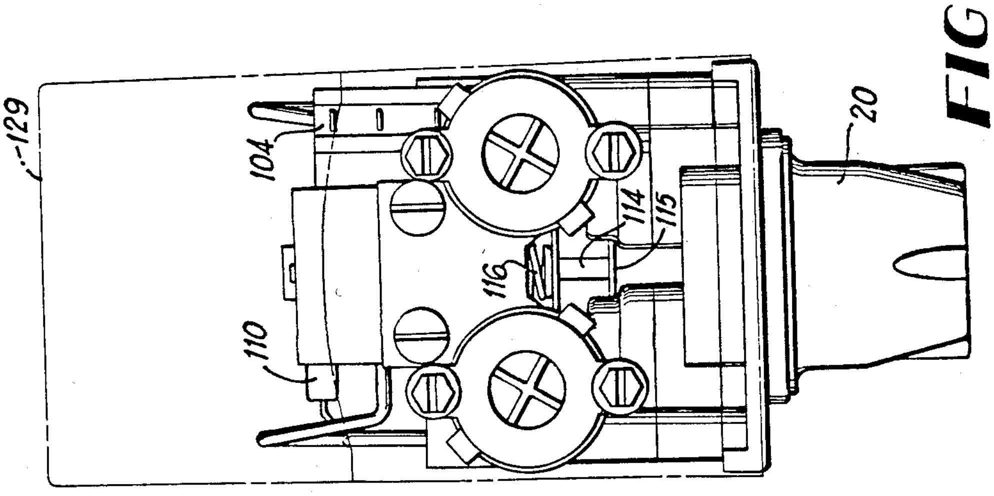
FIG. 7 is a front elevation view of the valve assembly of FIG. 5.
Figure 9:
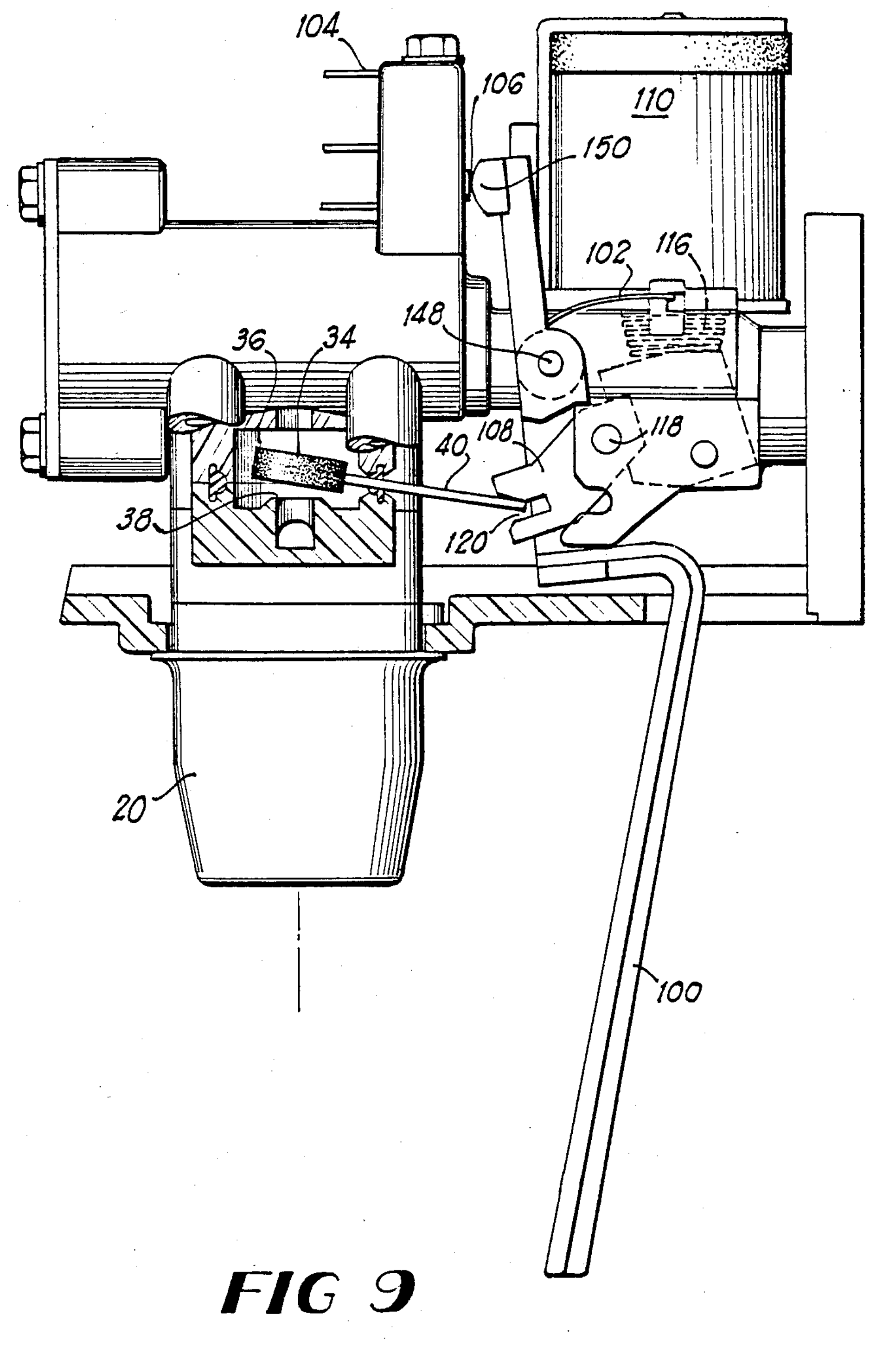

The cup lever arm 100 is mounted for movement about a pivot axis 112, from its rest position shown in FIGS. 5 and 8, to its actuated position shown in FIG. 9. In its actuated position shown in FIG. 9, the cup lever arm 100 pushes the button 106 to close the switch 104 and energize the solenoid 110. The two upper fingers 138 and 140 of the cup lever arm 100 each have an opening 142 and 144 therein, respectively, for receiving a pair of pivot pins 146 and 148 on the upper valve body 14. The finger 140 has an extension 150 that contacts the button 106 on the switch 104. The two fingers 138 and 140 are slightly pulled apart to snap the pins 146 and 148 into the holes 142 and 144.

The solenoid 110 includes an armature 114 having a disk 115 on its lower end. When the solenoid is energized, the arm 114 and the disk 115 move upwardly (in FIG. 8) against a spring 116 cause the yoke 108 to pivot about its pivot axis 118. The yoke 108 includes a pair of pivot pins 118 that are received in a pair of holes 130 in the upper valve body 14. The yoke 108 can be squeezed together to snap the pins 118 into the holes 130. The distal ends of the lever arms 40 and 46 of the syrup and carbonated water valves 34 and 44, respectively, are positioned in grooves 120 and 122, respectively, of the yoke 108. As in the mechanical version in FIG. 1, the yoke 108 does not include means for closing the carbonated water valve 44.

The solenoid 110 includes a bracket 180 which is connected to the upper body 14 by screws extending through the aligned two pairs of holes 182 and 184.

Thus, when a cup is pushed back against the cup lever arm 100, the syrup and carbonated water valves are quickly snapped open (see FIG. 9), to dispense the beverage. When the cup lever arm 100 is released, the return spring 102 causes the cup lever arm 100 to return to its rest position (FIG. 8), which opens the switch 104, de-energizes the solenoid 110 and the spring 116 pushes down on the yoke 108, causing it to pivot about axis 118 and snap close the syrup valve 34. As in the mechanical version, carbonated water can be separately dispensed by means of the sode lever arm 160.

Figure 16:
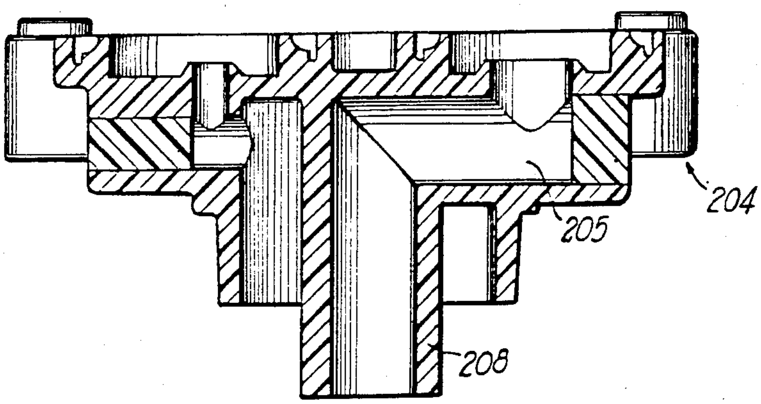
FIG. 16 is a cross-sectional, elevational view through the gravity lower body, similar to FIG. 12 of the pressure lower body.

The lower valve body 16 is the same in both the mechanical and electrical versions of the pressure version of the valve assembly of this invention, however, it differs from the lower body 204 used in the gravity version of the valve assembly. The lower body 16 is shown in more detail in FIGS. 10–12, and the lower body 204 is shown in FIG. 16.

Figure 10:
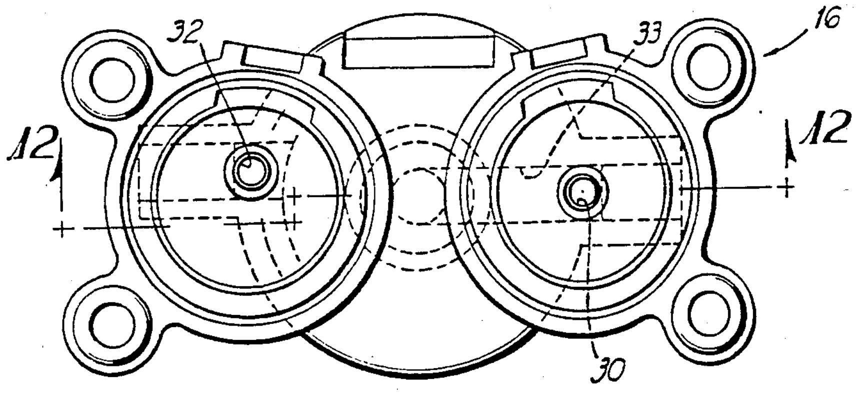
FIGS. 10–12 are top and bottom plan views and a cross-sectional view, respectively, through the lower body 16 of the pressure version of the valve sub-assembly 10.
Figure 11:
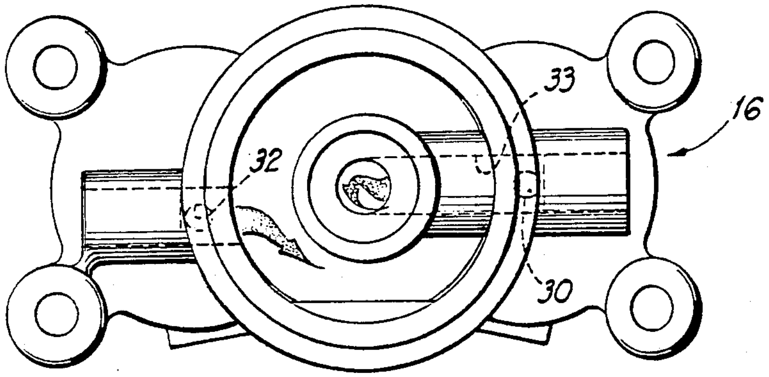
Figure 12:
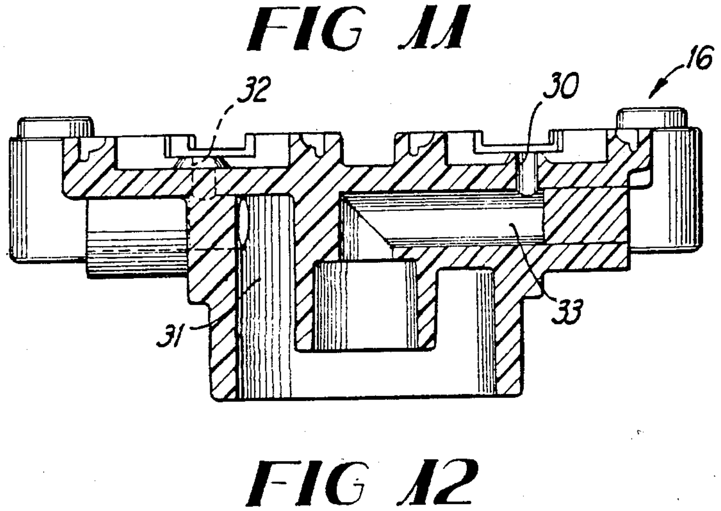
Figure 13:
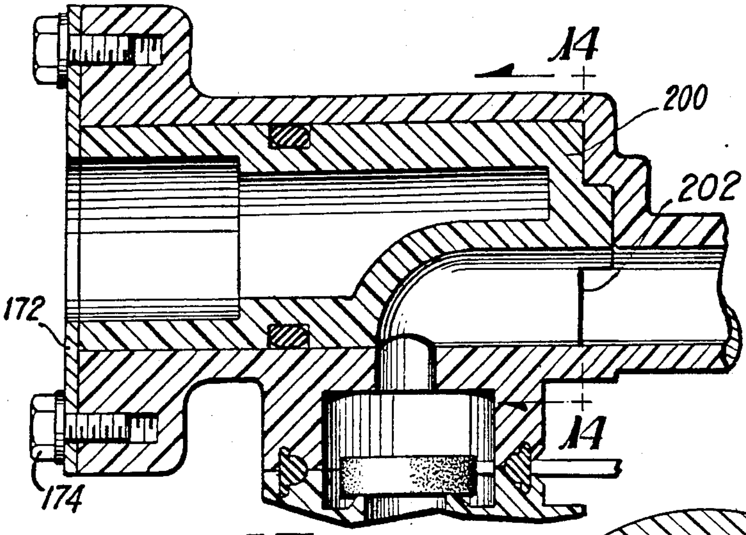
FIG. 13 is a partial, cross-sectional view through the syrup flow control chamber of the gravity version of the valve assembly of the present invention.
Figure 14:
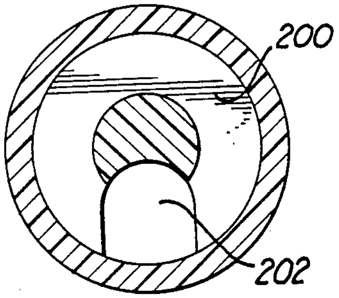
FIG. 14 is an end view of the plug for the syrup flow control chamber for use during gravity operation.

FIGS. 10–12 show the lower body 16 having its water aperture 32 and syrup aperture 30. From the water aperture 32 water flows through a passageway 31 into the nozzle 20, and syrup flows from aperture 30 through a passageway 33 to the nozzle.

Both the mechanical and electrical versions of the pressure version of the valve assembly of the present inventions have now been described. It is thus seen that the valve sub-assembly 10 can be easily converted from one to the other by removing one cup lever arm and valve actuator and replacing them with the other.

The valve sub-assembly 10 includes the following common features and components: a housing 129 (see FIG. 6) including the lower plate 22, the nozzle 20, the soda lever arm 160, the valve body 12 (including upper and lower valve bodies 14 and 16, respectively), the syrup and carbonated water conduits, flow control chambers 126 and 128, valves 34 and 44 and the mounting plate 124. The upper valve body 14 includes the pair of flow control chambers 126 and 128 for receiving (in the pressure version) any one of a number of different, well-known flow controls (which are thus not shown in detail herein) for the carbonated water and the syrup conduits, respectively. After flow controls 166 and 168 (see FIG. 7) have been positioned in the chambers 126 and 128, a pair of covers or retainers 170 and 172 is attached to the upper body 14 by screws 174.

An additional common feature is a carbonated water lever 160 for manually opening the carbonated water valve 44 (see FIGS. 1, 2 and 5) when it is desired to dispense only carbonated water.

The aspect of the present invention of converting the valve assembly (either mechanical or electrical) of the present invention back and forth between pressure and gravity operation will now be described with reference to FIGS. 13–16.

The valve assemblies shown in FIGS. 1–12 are for pressure operation. To convert to gravity operation, the following steps are carried out:

1. the syrup flow control 168 is removed and replaced with a plug 200 (FIG. 13) having a syrup flow passageway 202 therethrough;

2. the nozzle 20 and its interior elements for use in pressure dispenser nozzles are removed and the same nozzle 20 (the cylindrical outer member) is replaced but with different interior elements 212 (FIG. 15), such as any well-known interior elements used in nozzles for gravity operation; and 3. the lower body 16 is removed and replaced with a gravity lower body 204 (FIG. 16), having a larger syrup conduit 205 therethrough. The lower body includes a tube 208 shown in FIGS. 15 and 16; and orifice 206 (or washer) is connected to the bottom of the tube 208 by a connector 210. The size of the opening in the orifice is preferably about 0.30 inches. It is noted that the paddle valve has a sufficiently large diameter to cover and accomodate both pressure and gravity ports in the two lower bodies, so that the paddle valve does not have to be changed when switching between pressure and gravity.

Figure 15A:
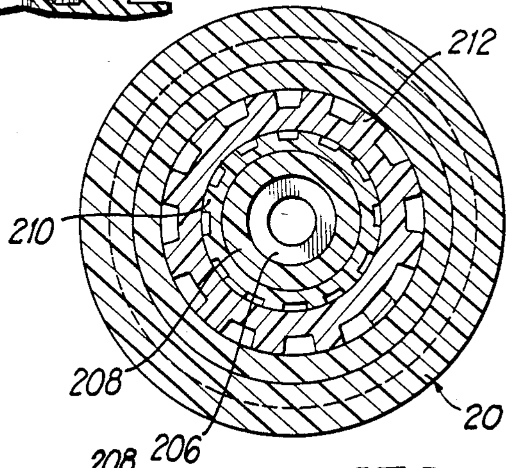
FIG. 15A is a top plan view of the element 209 in FIG. 15.
Figure 15:
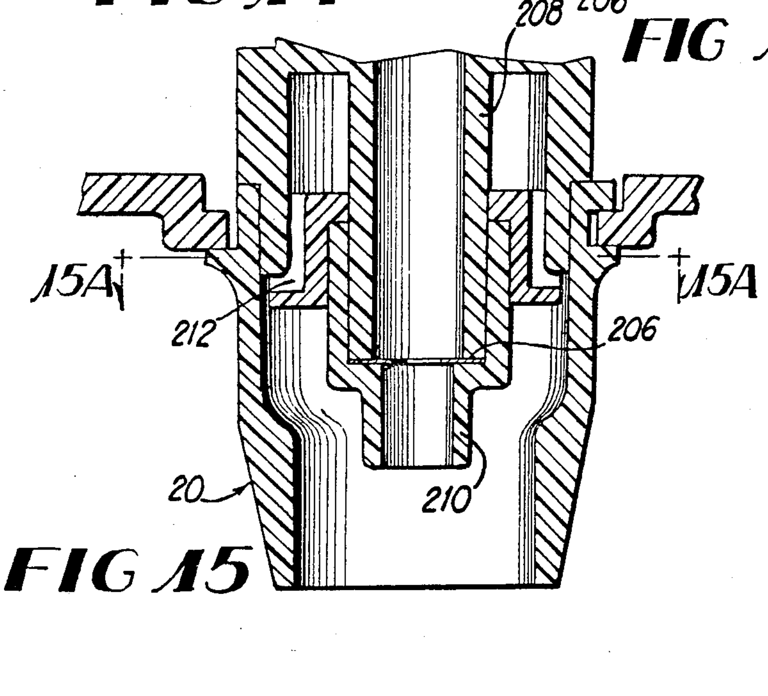
FIG. 15 is a cross-sectional side view through a nozzle used in the gravity embodiment of the present invention.

The inner element 212 used in the gravity valve assembly 219 is shown in plan view in FIG. 15A.

Figure 17:
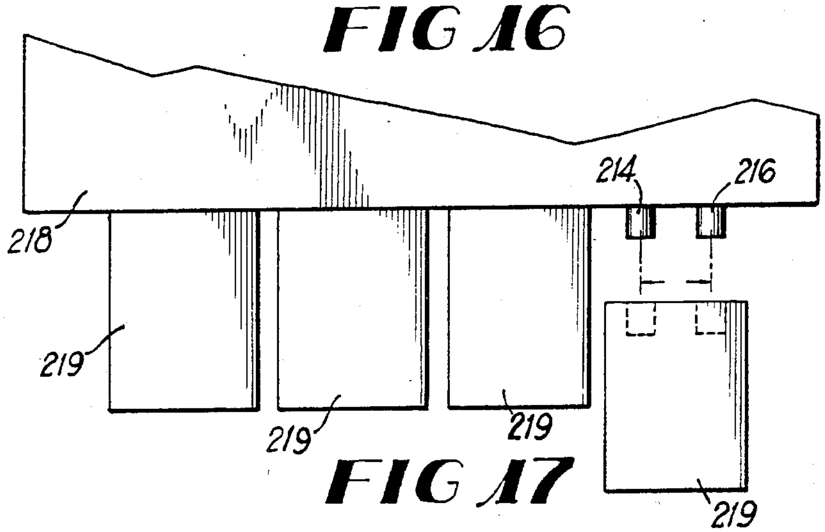
FIG. 17 is a partly diagrammatic plan view of a gravity dispenser and the gravity valve assembly of this invention.
Figure 18:
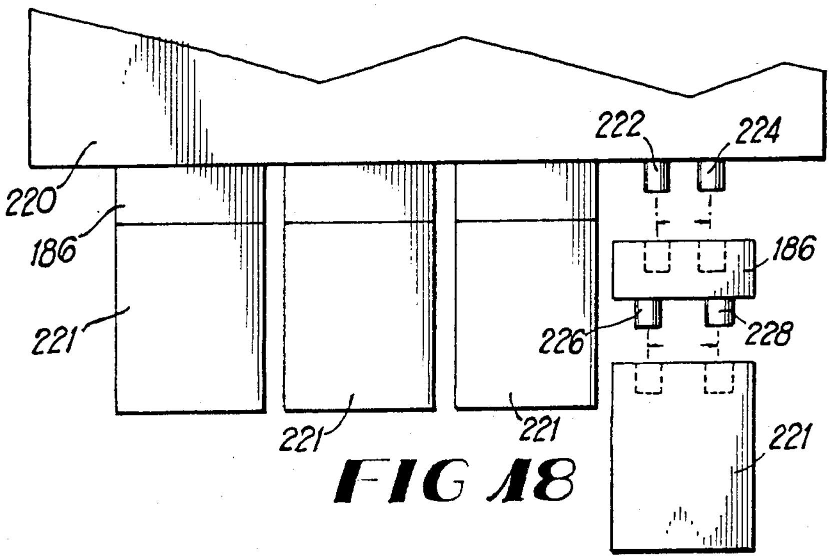
FIG. 18 is a partly diagrammatic plan view of a pressure dispenser and the pressure valve assembly of the present invention.

Another feature of the valve assembly of this invention that allows easy conversion between pressure and gravity operation concerns the spacing of the water and syrup openings in the mounting plate 124, as shown in FIGS. 17 and 18. The spacing between the water and the syrup outlets in standard pressure and gravity dispensers is different; in gravity dispensers the spacing between the centers of the two conduits is 1.0 inch, while it is 0.785 inch in pressure dispensers. However, the valve assembly of this invention can be attached to either type of dispenser without requiring any modification due to this difference in spacing, as described below with reference to FIGS. 17 and 18.

FIG. 17 shows a gravity valve assembly 219 of this invention connected (by screws) to a gravity dispenser 218 having water and syrup conduits 214 and 216. A mounting block is not used in gravity dispensers. FIG. 18 shows a pressure valve assembly 221 of this invention connected to a pressure dispenser 220 having water and syrup conduits 222 and 224, spaced closer together than are the gravity dispenser conduits 214 and 216. A mounting block 186 is attached to the pressure dispenser 220 and has its own water and syrup conduits 226 and 228, spaced-apart the same, greater distance as are the gravity dispenser conduits 214 and 216.

The mounting plate 124 of the valve assembly of this invention has its water and syrup inlet ports spaced-apart the same distance as are the conduits 214 and 216 in the gravity dispenser 218.

Thus, the valve assembly of this invention does not require any modifications concerning such spacing differences when converting from pressure to gravity.

In addition, it is noted that the syrup conduit 24 (FIG. 1) has a passageway of a diameter that can be used in both pressure and gravity operation. That is, rather than having a 0.187 inch I.D. (for pressure use), it has a 0.300 inch I.D. so it can accommodate both pressure and gravity operation. The water conduit 26 has a 0.187 inch I.D. in both gravity and pressure dispensers.

From the above description, it will be seen that the present invention provides the following advantages in addition to those previously discussed. The valve assembly feature is a unique snap-acting mechanism requiring fewer parts than other snap-acting mechanisms. The mounting block 186 connects to the valve more securely than do existing mounting blocks, and requires fewer parts than other designs. The liquid flow from the rear of the mounting block 186 to the nozzle 20 is more direct than in previous valve assemblies. This minimizes entrapped liquid and helps reduce carbonation breakout. The water valve seat can be located closer to the pivot point (off-center), to reduce the force required to open the valve.

While the preferred embodiments of the present invention have been described above in detail, it is to be understood that variations and modifications can be made therein without departing from the spirit and scope of the present invention as set forth in the appended claims. For example, other arrangements of snap-acting springs can be used in the mechanical valve actuator 60. Other arrangements of valve bodies 12 can also be used. A single cup lever arm can be used having the necessary features of both the electrical and mechanical versions, if desired. While the preferred embodiments have been described for use with syrup and carbonated water, other liquids can be used. Other types of valves than paddle valves can be used, if desired. While a pull solenoid is described, the electrical version can be modified for use with a push solenoid, if desired. The valve assemblies of the present invention can be switched between having a standard flow rate ($1\frac{1}{2}$ ounces per second) and a fast flow rate (3 ounces per second) by adjusting the flow controls.

What is claimed is:

1. A beverage dispenser valve sub-assembly for use in providing any one of an electrical or a mechanical beverage dispenser valve assembly comprising:

(a) a valve body including first and second separate liquid conduit means for providing first and second liquid conduits through said valve body, first and second control valves in said first and second conduits, respectively, for controlling the flow of liquid through said conduits;

(b) a vertically oriented, rear, mounting plate connected to said valve body and spaced apart from a major portion of said valve body to provide an opening therebetween for receiving a valve actuator;

(c) said major portion of said valve body including a flow control chamber in each of said first and second conduits;

(d) each of said first and second valves including a movable actuating lever arm extending outside of said respective conduit, and movable between valve closed and valve open positions, said actuating lever arms extending rearwardly adjacent to each other on a common plane and into said opening;

(e) means for removably supporting a pivotable cup lever arm on said valve body;

(f) means for removably supporting valve actuators, separate from said cup lever arm, on said valve body in said opening, comprising first means for supporting a mechanical valve actuator, and separate second means for supporting an electrical valve actuator, whereby said valve sub-assembly can be set up for operation as either a mechanical or an electrical beverage dispenser valve assembly; and (g) means on said valve body for supporting snap acting spring means for snap moving a mechanical valve actuator.

2. The valve sub-assembly as recited in claim 1 wherein said actuating lever arms converge toward each other.

3. The valve sub-assembly as recited in claim 1 wherein said first means includes a pair of spaced-apart grooves, and said second means includes a pair of spaced-apart holes.

4. The valve sub-assembly as recited in claim 1 wherein said major portion of said valve body includes a flow control chamber in each of said first and second conduits.

5. The valve sub-assembly as recited in claim 4 wherein said valve sub-assembly is for use in a pressure dispenser and including a flow control in each of said chambers.

6. The valve sub-assembly as recited in claim 4 wherein said valve sub-assembly is for use in a gravity dispenser and one of said chambers includes a flow control and the other includes a plug with a passageway therethrough.

7. The valve sub-assembly as recited in claim 1 wherein said mounting plate has separate, spaced-apart, first and second liquid ports communicating with said first and second conduits, respectively, and wherein said ports are spaced apart 1.0 inch.

8. A beverage dispensing valve assembly comprising:

(a) a valve body including first and second separate liquid conduits therethrough and first and second valves in said first and second conduits, respectively, for controlling flow therethrough;

(b) a pivotable cup lever arm mounted for movement between a rest position and an actuated position;

(c) mechanical valve actuating means interconnected between said cup lever arm and said first and second valves for snap moving said valves to simultaneously open both of said valves when said cup lever arm is moved to its actuated position;

(d) said first and second valve means including first and second movable actuating lever arms, respectively, extending outside of said respective conduits and movable back and forth between valve closed and valve open positions;

(e) said mechanical valve actuating means including a pivotable yoke connected to said cup lever arm and movable from a rest position to an actuated position when said cup lever arm is moved from its rest to its actuated position, said yoke including separate first and second contacting means for contacting said first and second actuating lever arms, respectively; and (f) snap-acting spring means connected to said yoke for snap moving said yoke from its rest position to its actuated position as said cup lever arm is moved from its rest position to its actuated position, such that said first and second contacting means snap contact said first and second actuating lever arms, respectively, to simultaneously snap open both of said valve means.

9. The beverage dispenser valve assembly as recited in claim 8 wherein said spring means includes a central coil spring and a pair of identical outboard springs on opposite side of said central coil spring.

10. The beverage dispenser valve assembly as recited in claim 9 wherein said actuating lever arms are in a common plane and converge toward each other and have distal ends located in said yoke.

11. the beverage dispenser valve assembly as recited in claim 8 wherein said spring means includes a central coil spring connected between said yoke and said cup lever arm.

12. The beverage dispenser valve assembly as recited in claim 11 wherein said cup lever arm includes a hollow spring housing enclosing part of the length of said spring and contacting and bending said spring downwardly as said cup lever arm is moved from its rest to its actuated position.

13. The beverage dispenser valve assembly as recited in claim 12 wherein said spring means includes a pair of outboard springs connected between said valve body and said yoke for aiding the over-center snap-action of said spring means.

14. The beverage dispenser valve assembly as recited in claim 11 including means for bending said central coil spring downwardly as said cup lever arm moves rearwardly.

15. The beverage dispenser valve assembly as recited in claim 14 wherein said central coil spring returns said cup lever arm to its rest position when force thereagainst is removed.

16. A beverage dispenser valve assembly comprising:

(a) a valve body including first and second separate liquid conduits therethrough and first and second valves in said first and second conduits, respectively, for controlling flow therethrough;

(b) a pivotable cup lever arm mounted for movement between a rest position and an actuated position;

(c) valve actuating means operatively interconnected between said cup lever arm and said first and second valves for simultaneously snap moving said valves to open both of said valves when said cup lever arm is moved to its actuated position;

(d) said valve actuating means including a pivotable yoke operatively associated with said cup lever arm and movable from a rest position to an actuated position when said cup lever arm is moved from its rest position to its actuated position;

(e) each of said first and second valves including a movable actuating lever arm extending outside of said respective conduit, and movable between valve closed and valve open positions;

(f) said yoke including means for simultaneously moving said lever arms from their valve closed to their valve open position when said yoke is moved from its rest position to its actuated position; and (g) wherein said valve actuating means is a mechanical valve actuating means and includes snap-acting spring means for snap moving said yoke when said cup lever arm moves from its rest position to its actuated position.

17. The beverage dispensing valve assembly as recited in claim 16 wherein said mechanical valve actuating means is easily removable from said valve assembly and can be easily replaced by an electrical valve actuating means.

18. The valve assembly as recited in claim 16 wherein said valve assembly includes first support means for said mechanical valve actuator and separate second support means for an electrical valve actuator.

19. The valve assembly as recited in claim 16 wherein said second conduit is for syrup and has a diameter of about 0.300 inch whereby said conduit can accommodate both pressure and gravity operation of said valve assembly.

20. The valve assembly as recited in claim 16 wherein said valve assembly includes a mounting plate having separate, spaced-apart first and second liquid ports communicating with said first and second conduits, respectively, and wherein said ports are spaced-apart 1.0 inch.

21. The valve assembly as recited in claim 16 wherein said valve body includes a flow control chamber in each of said first and second conduits.

22. The valve assembly as recited in claim 21 including a flow control in one of said chambers and a plug with a passageway therethrough, in the other of said chambers.

23. A method comprising:

(a) providing a beverage dispenser valve sub-assembly including a valve body including first and second separate liquid conduits therethrough, first and second control valves in said first and second conduits, respectively, for controlling the flow of liquid through said conduits, a vertically oriented, rear, mounting plate connected to said valve body and spaced-apart from a major portion of said valve body to provide an opening therebetween for receiving a valve actuator, said major portion of said valve body including a flow control chamber in each of said first and second conduits, each of said first and second valves including a movable actuating lever arm extending outside of said respective conduits and movable between valve closed and valve open positions, said actuating lever arms extending rearwardly adjacent to each other on a common plane and into said opening, means for removably supporting a pivotable cup lever arm on said valve body, and means for removably supporting either one of two different valve actuators, on said valve body and in said opening, including first means for supporting an electrical valve actuator, separate second means for supporting a mechanical valve actuator, and means on said valve body for supporting snap acting spring means for snap moving a mechanical valve actuator;

(b) connecting a cup lever arm to said valve sub-assembly; and (c) connecting a valve actuator to said valve sub-assembly in said opening.

24. The method as recited in claim 23 wherein said valve actuator is an electrical valve actuator.

25. The method as recited in claim 23 wherein said valve actuator is a mechanical valve actuator.

26. The method as recited in claim 23 wherein said valve actuator is one of a mechanical valve actuator or an electrical valve actuator, and including the step of removing said one of said valve actuators and replacing it with the other of said valve actuators.

27. The method as recited in claim 23 including placing a flow control in each of said chambers for use of said valve sub-assembly in a pressure dispenser.

28. The method as recited in claim 27 including converting said valve sub-assembly for use in a gravity dispenser including the step of replacing of said flow controls with a plug having a passageway therethrough.

29. The method as recited in claim 23 including placing a flow control in one of said chambers and a plug with a passageway therethrough in the other chamber, for use of said valve sub-assembly in a gravity dispenser.

30. A method comprising:

(a) providing a beverage dispenser valve assembly including a valve body having first and second separate liquid conduits therethrough and first and second valves in said first and second conduits, respectively, for controlling fluid flow therethrough, a pivotable cup lever arm mounted for movement between a rest position and an actuated position, valve actuating means interconnected between said cup lever arm and said valves for snap moving said valves to simultaneously open both of said valves when said cup lever arm is moved to its actuated position, a yoke interconnected between said valve actuating means and said valves and being movable by said valve actuating means from a rest to an actuated position when said cup lever arm is moved from its rest to its actuated position, each of said valves including a movable actuating lever arm extending outside of said conduits and movable between valve closed and valve open positions, and said yoke being operatively associated with said actuating lever arms for moving said lever arms from their rest to their actuated position;

(b) providing said valve actuating means as one of: (1) an electrically operated valve actuating means including a single solenoid, and (2) a mechanical valve actuating means including a snap-acting spring means; and (c) converting said valve assembly for use with the other of said valve actuating means by removing one of said electrical and mechanical valve actuating means and replacing it with the other of said electrical and mechanical valve actuating means.

31. The method as recited in claim 30 including providing said valve assembly with first means for supporting a mechanical valve actuator and second means for supporting an electrical valve actuator.

32. The method as recited in claim 30 wherein said converting step includes removing said cup lever arm and replacing it with a cup lever arm for said other of said electrical and mechanical valve actuating means.

* * * * *